(12) United States Patent
Khare et al.

(10) Patent No.: US 8,639,094 B2
(45) Date of Patent: Jan. 28, 2014

(54) SYSTEM AND METHOD FOR REMOTE CONTROL OF LIVE TV CAPABILITY FOR TV SCREENS

(76) Inventors: Rajendra Kumar Khare, Bangalore (IN); Ravi Bhat, Bangalore (IN); Abhijit Das, Bangalore (IN); Anant Kansal, Bangalore (IN); Manjit Rath, Bangalore (IN); Saurabh Singh, Bangalore (IN); Tushar Vyas, Bangalore (IN); Sanchit Sanga, Bangalore (IN); Prabhvir Sahmey, Bangalore (IN); Bolin Bolin, Bangalore (IN); Cvl Srinivas, Bangalore (IN); Shivprasanth Shivprasanth, Bangalore (IN); Aparna Sharma, Bangalore (IN); Rajendra Dwivedi, Bangalore (IN); Mohammad Mohammad, Bangalore (IN); Vikas Minda, Bangalore (IN); Bm Gurucharan, Bangalore (IN)

( * ) Notice: Subject to any disclaimer, the term of this patent is extended or adjusted under 35 U.S.C. 154(b) by 361 days.

(21) Appl. No.: 12/741,208

(22) PCT Filed: Nov. 4, 2008

(86) PCT No.: PCT/IN2008/000733
§ 371 (c)(1),
(2), (4) Date: May 4, 2010

(87) PCT Pub. No.: WO2009/057148
PCT Pub. Date: May 7, 2009

(65) Prior Publication Data
US 2010/0259692 A1    Oct. 14, 2010

(30) Foreign Application Priority Data

Nov. 4, 2007 (IN) .......................... 2516/CHE/2007

(51) Int. Cl.
*H04N 5/94* (2006.01)
(52) U.S. Cl.
USPC ........................................................ 386/276
(58) Field of Classification Search
None
See application file for complete search history.

(56) References Cited

U.S. PATENT DOCUMENTS

2004/0175096 A1    9/2004    Caspi et al.
2006/0253874 A1*   11/2006   Stark et al. ...................... 725/62

FOREIGN PATENT DOCUMENTS

WO    WO/0232119 A1    4/2002

* cited by examiner

*Primary Examiner* — William C Vaughn, Jr.
*Assistant Examiner* — Daniel Tekle
(74) *Attorney, Agent, or Firm* — Barry Choobin; Patent360 LLC

(57) ABSTRACT

A system for remote control of live TV capability for TV screens, the system comprising satellite feeds (2003) broadcasting means (2002, 2004), a set top box (2005), a Smart-IB box (2006) capable of sending and receiving data/content, a central server capable of interpreting received data/content from Smart-IB, a communication network having interactive means coupled with world wide web (2008), a display screen (2007) having display means operable to display data/information. A method for remote control of live TV capability for TV screens, the method comprising the steps of receiving a schedule to record and/or relay set top box content, forwarding desired frequency to remote signal inducing means (RSIM), generating infrared (IR) signal, interpreting infrared (IR) signal by set top box, changing audio-video (AV) output as per the schedule list, recording/relaying audio-video (AV) output.

11 Claims, 4 Drawing Sheets

US 8,639,094 B2

SYSTEM AND METHOD FOR REMOTE CONTROL OF LIVE TV CAPABILITY FOR TV SCREENS

CROSS REFERENCE TO RELATED APPLICATION

This invention is a divisional out of the original Patent Application No. 2516/CHE/2007 dated Nov. 4, 2007.

FIELD OF THE INVENTION

The present invention relates to a system and method for remote control of live TV capability for TV screens through an IR interface device. More particularly, the present invention relates to a system and method for simulation of infrared (IR) signals to enable tuning of a particular frequency to store, schedule and play data/content as per the scheduled list.

BACKGROUND OF THE INVENTION

There is a need for a system and method for remote control of live TV capability for TV screens through an IR interface device. This need is primarily due users wish to physically control a remote device such as a television screen without being near to that device.

SUMMARY OF THE INVENTION

A system and method for remote control of live TV capability for TV screens through an IR interface device are provided.

Briefly, one exemplary embodiment relates to a method for remote control of live TV capability for TV screens, the method comprising the steps of receiving a schedule to record and/or relay set top box content, forwarding desired frequency to remote signal inducing means (RSIM), generating infrared (IR) signal, interpreting infrared (IR) signal by set top box, changing audio-video (AV) output as per the schedule list, recording/relaying audio-video (AV) output.

Another exemplary embodiment relates to a system for remote control of live TV capability for TV screens, the system comprising satellite feeds, broadcasting means, a set top box, a Smart-IB box capable of sending and receiving data/content, a central server capable of interpreting received data/content from Smart-IB, a communication network having interactive means coupled with world wide web, a display screen having display means operable to display data/information.

The object of the present invention is to provide a system and method for remote control of live TV capability for TV screens through an IR interface device.

Another object of the present invention is to provide a system and method for simulation of infrared (IR) signals to enable tuning of a particular frequency to store, schedule and play data/content as per the scheduled list.

Yet another object of the present invention is to provide a system and method to take the audio-video (AV) output of the set top box and start recording the program so that it may be replayed at any future time as may be decided by the system server which schedules the playlist.

Yet another object of the present invention is to provide a system and method to switch channels on the set-top box by inducing the same frequency no matter what channel it is tuned earlier.

DETAILED DESCRIPTION OF THE INVENTION

A system and method for remote control of live TV capability for TV screens through an IR interface device are provided.

In the following description for purposes of explanation, specific details are set forth in order to provide a thorough understanding of the present invention. It will be evident, however, to one skilled in the art that the present invention may be practiced without these specific details. In other instances, well known methods, procedures, components and circuits have not been described in detail so as not to obscure the present invention.

The present invention now will be described more fully hereinafter with reference to the accompanying drawings, which form a part hereof, and which show, by way of illustration, specific exemplary preferred embodiments by which the invention may be practiced. This invention may, however, be embodied in many different forms and, should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

Figure 1:
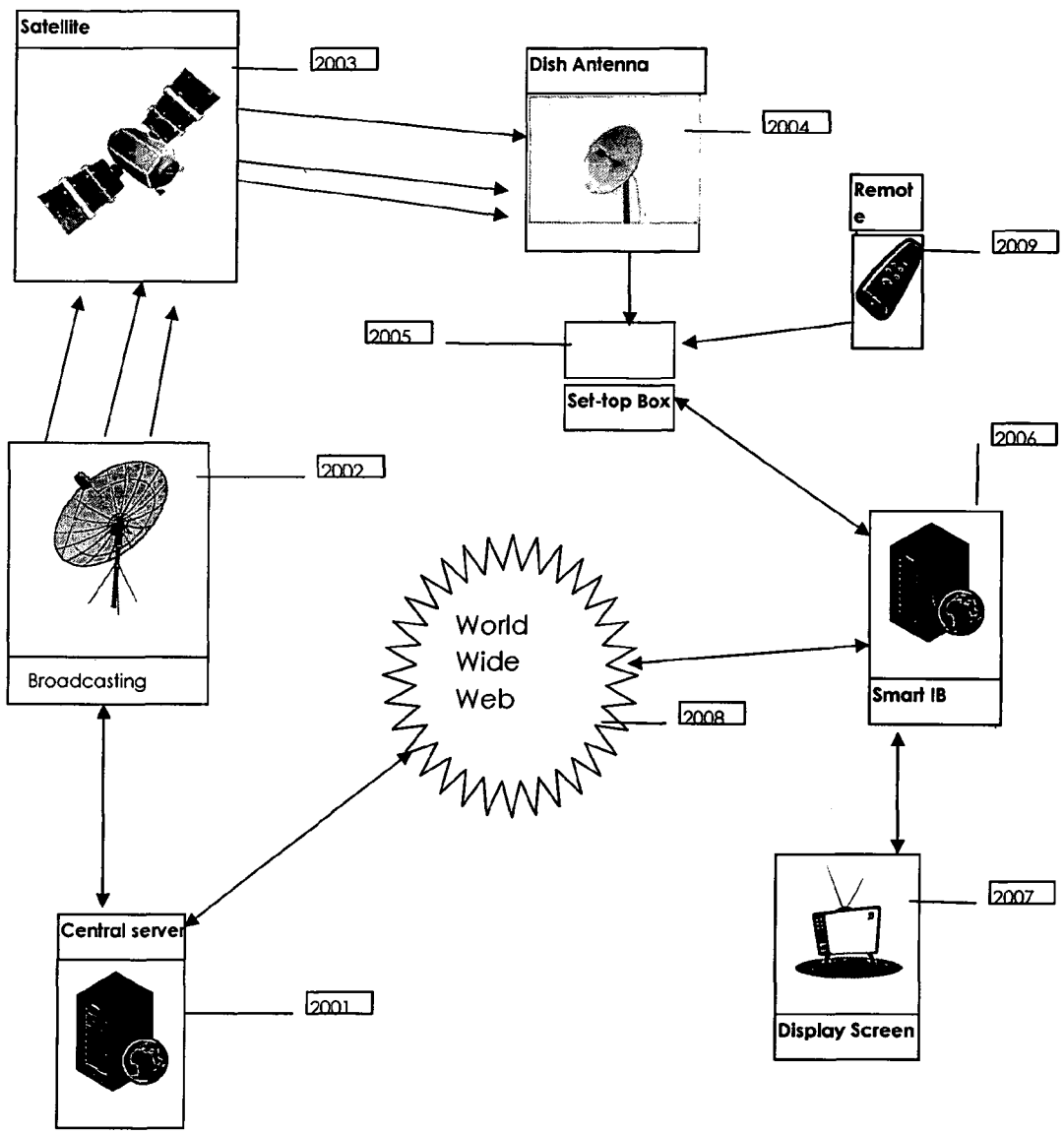
FIG. 1 is a system for remote control of live TV capability for TV screens.

Referring to FIG. 1, it depicts a system for remote control of live TV capability for TV screens, the system comprising satellite feeds 2003, broadcasting means 2002, 2004, a set top box 2005, a Smart-IB box 2006 capable of sending and receiving data/content, a central server 2001 capable of interpreting received data/content from Smart-IB 2006, a communication network having interactive means coupled with world wide web 2008, a display screen 2007 having display means operable to display data/information.

In a preferred embodiment, the data/content is delivered to the smart-IB and then to the display screen. Bulk of data/content may be transferred via satellite while small packets like acknowledgement like proof of play etc can be transmitted through world wide web.

The playlist of the order in which data/content needs to be displayed may be transmitted to smart-IB from central server through world wide web. The set-top box can be tuned by remote that uses a frequency such as infrared (IR) or other frequency such as short range frequency or the like.

Figure 2:
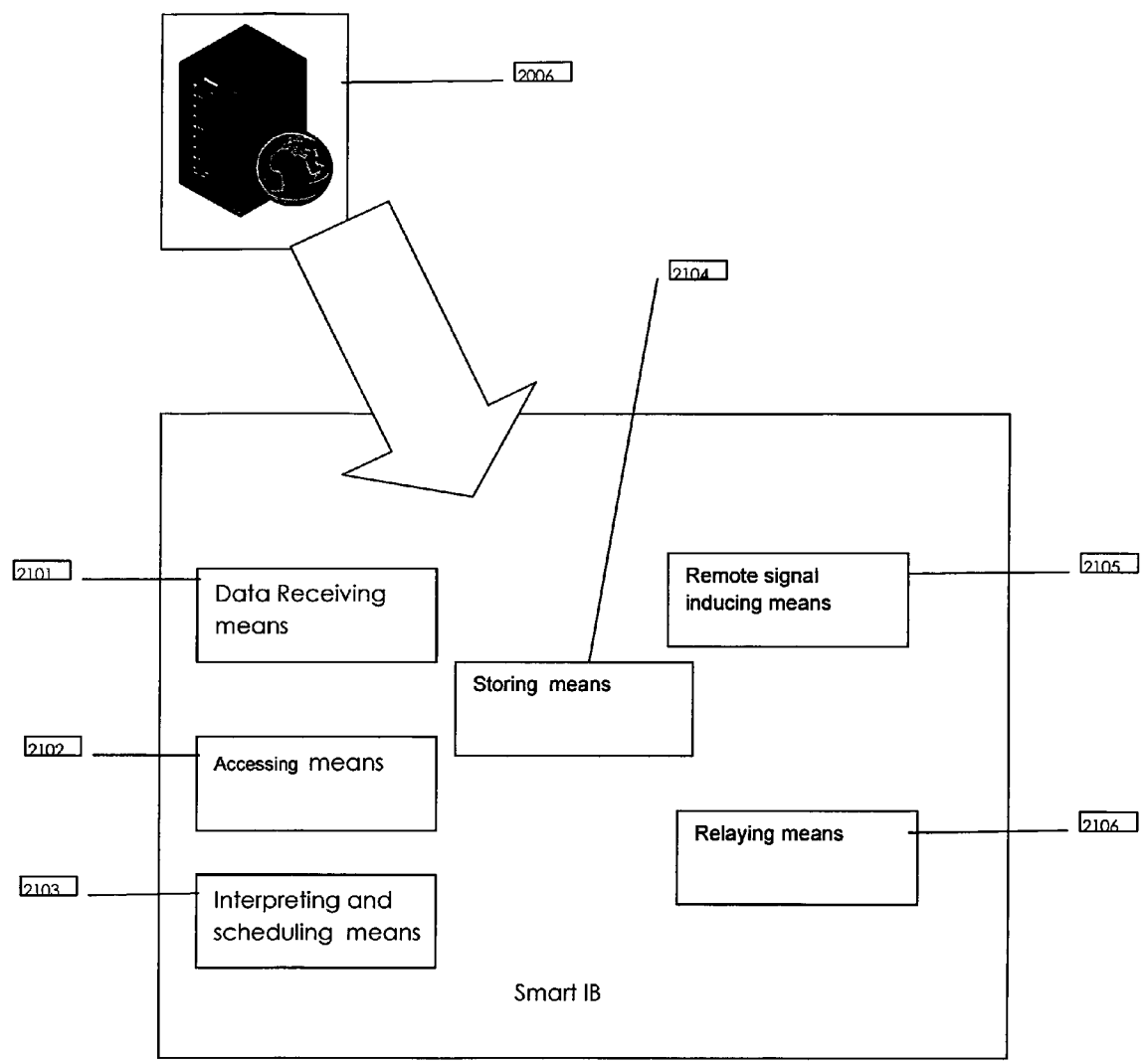
FIG. 2 illustrates the hardware elements of the central server.

FIG. 2 illustrates the hardware elements of the central server, wherein the central server 2006 comprises data receiving means 2101, accessing means 2102 to access the data/content, interpreting and scheduling means 2103 to interpret and schedule the data/content as per the schedule list, storing means 2104 to store the data/content, remote signal inducing means 2105 and relaying means 2106.

Figure 3:
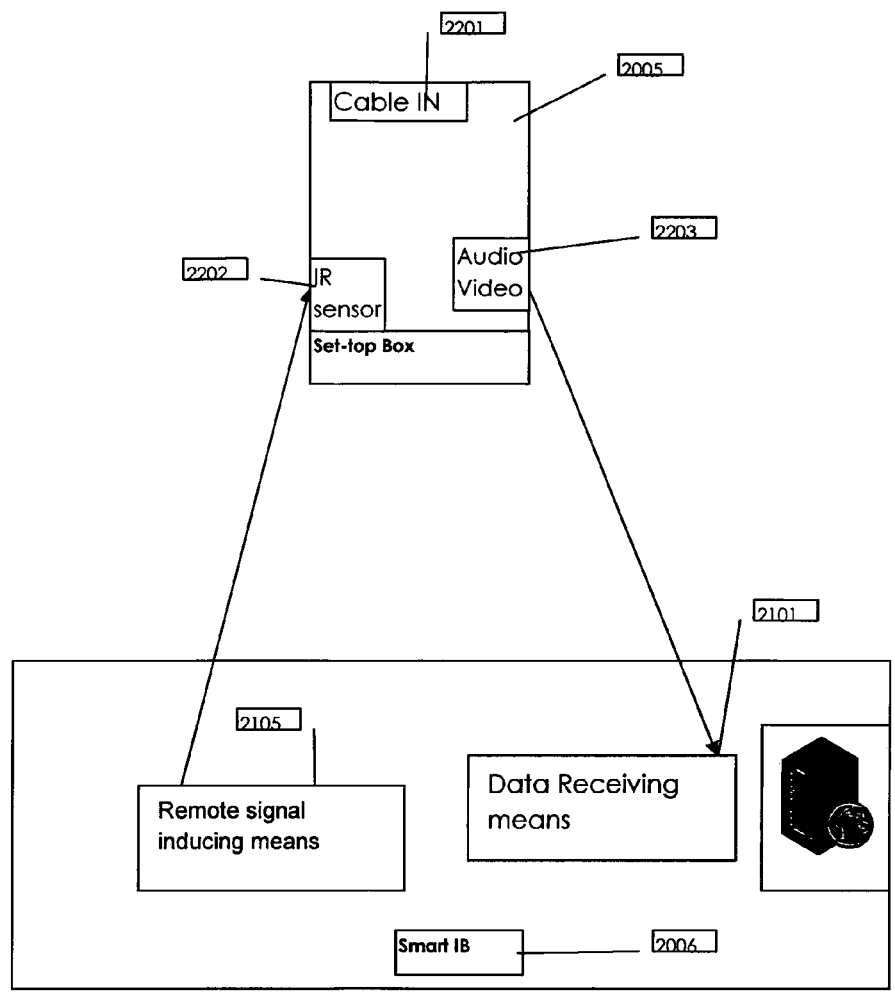
FIG. 3 illustrates a schematic diagram of the environment of relay of data/content through remote signal inducing means (RSIM).

FIG. 3 illustrates a schematic diagram of the environment of relay of data/content through remote signal inducing means (RSIM) 2105 wherein RSIM contains an infrared transmitter and a frequency generator that is attuned to create desired frequencies. The set-top box 2005 contains an infrared sensor 2202 which detects the frequency so generated by the remote signal inducing means (RSIM) 2105. At a desired time interpreting and scheduling means forward a request for a frequency to be tuned to the remote signal inducing means (RSIM). The RSIM 2105 interprets the frequency so generated and generate relevant IR frequency signals. These signals are received by the set-top box 2005 and it causes the set-top box to switch a channel, thereby modifying the audio-video (AV) output.

Figure 4:
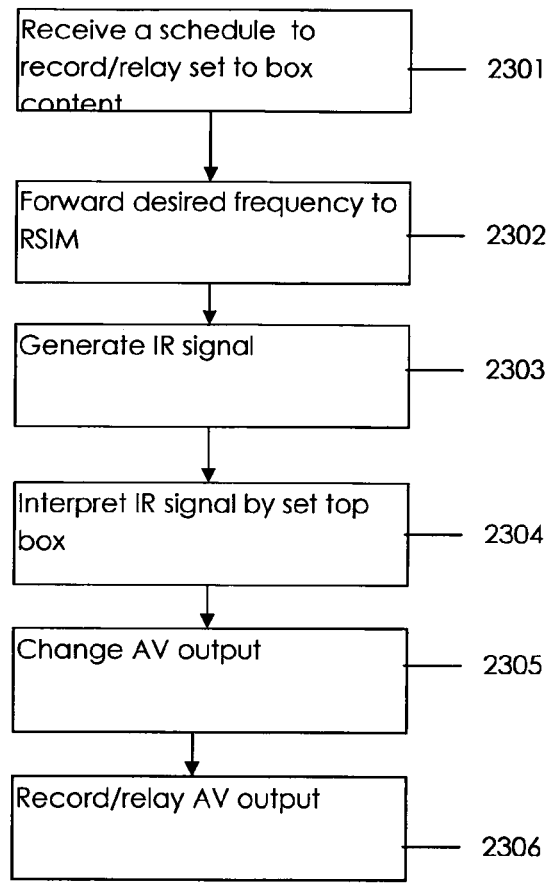
FIG. 4 illustrates a method for remote control of live TV capability for TV screens.

FIG. 4 illustrates a method for remote control of live TV capability for TV screens, the method comprising the steps of receiving a schedule 2301 to record and/or relay set top box content, forwarding 2302 desired frequency to remote signal inducing means (RSIM), generating infrared (IR) signal 2303, interpreting infrared (IR) signal 2304 by set top box, changing audio-video (AV) output 2305 as per the schedule list, recording/relaying 2306 audio-video (AV) output.

The method provides for remote control of live TV/PVR capability for TV screens through an interactive interface device that emulates the infrared remote commands. The set top box accepts the commands and replays the data/content according to the schedule list. The scheduling logic maintains the output on display screens.

The smart-IB is either connected to the television screen using a set-top box or directly. Where the television display screen is connected with a set-top box, the remote control device changes the frequencies of the output of the set-top box. The present system records such frequencies and induces the same at the desired time according to the schedule list. The present method takes the audio-video (AV) output of the set-top box and starts recording the program so that it may be replayed at any future time as may be decided by the system server that schedules the playlist. The scheduled data/content is further transmitted to the smart-IB for further processing.

The data/content is recorded, sorted and played through out the day as per the schedule list. The system receives the data/content, select and record the relevant data/content as per the schedule list which can be displayed in future on demand any time as per the user's requests. The irrelevant data/contents are rejected. The invention therefore obviates a major problem of transmitting a bulk of data/content which is delivered for relay on a limited band width to display screens.

The instant invention in yet another aspect relates to a method and system to facilitate the use of stored content under remote control which can be used to deliver quality audio and/or video and avoid the effects of trees, bridges, tall buildings etc. for trains and buses thereby removing the poor transmission and reception problems.

The blocks of the flowchart illustration support combinations of means for performing the specified actions, combinations of steps for performing the specified actions and program instruction means for performing the specified actions.

Although, the invention has been described with reference to specific examples, it would be appreciated by those skilled in the art that the invention may be embodied in many forms without departing from the broader spirit and scope of the invention as set forth in the invention. Preferred embodiments of this invention have been described herein, including the best mode known to the inventor for carrying out the invention. Variations of those preferred embodiments may become apparent to those of ordinary skill in the art upon reading the foregoing description.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Accordingly, the specification and drawings are to be regarded in an illustrative rather than a restrictive sense without departing from the spirit and scope of the invention, the invention resides in the claims hereinafter appended.

We claim:

1. A method for remote control of live TV capability for TV screens, the method comprising the steps of:
    receiving a schedule list from a central server to record and/or relay a set top box content;
    forwarding a desired frequency to a remote signal inducing means (RSIM);
    interpreting the forwarded desired frequency and generating an infrared {IR} signal at the remote signal inducing means (RSIM), and wherein the generated infrared signal corresponds to desired frequency;
    receiving and interpreting the generated infrared (IR) signal by the set top box and wherein the received infrared (IR) signal causes the set top box to switch a channel;
    changing an audio-video (AV) output as per the schedule list;
    recording/relaying the audio-video (AV) output; and
    wherein the audio-video (AV) output of the set top box is taken to record a program for replaying at a future time which is decided by the system server according to the schedule list, and wherein a data content is received, selected, recorded and displayed in future on demand at any time as per a request of a user and wherein an irrelevant data content are rejected thereby obviating a transmission of a bulk of data content which is delivered for relay on a limited bandwidth to a display screen and wherein the audio-video is delivered without an effect of trees, bridges, tall buildings for trains and buses thereby removing poor transmission and reception problems.

2. The method as claimed in claim 1, wherein the AV output is received by the Smart-IB which records the data/content.

3. The method as claimed In claim 1, wherein the data/content is relayed at a defined time as per the scheduled play list, and wherein the time is defined by the system server and the scheduled playlist is generated by the system server.

4. A system for remote control of live TV capability for TV screens, the system comprising: satellite feeds; a broadcasting means; a set top box; a Smart-IB box capable of sending and receiving a data/content; a central server capable of interpreting a received data/content from the Smart-IB; a communication network having an interactive means coupled with world wide web; wherein the smart IB receives the audio-video (AV) output of the set top box to record a program for replaying at a future time which is decided by the central server according to the schedule list, and wherein a data content is received, selected, recorded and displayed in future on demand at any time as per a request of a user and wherein an irrelevant data content are rejected thereby obviating a transmission of a bulk of data content which is delivered for relay on a limited bandwidth to a display screen and wherein the audio-video is delivered without an effect of trees, bridges, tall buildings for trains and buses thereby removing poor transmission and reception problems; a display screen having a display means operable to display a data/information.

5. The system as claimed in claim 4, wherein the set-top box is tuned by remote that uses a frequency such as infrared (IR) and/or short range frequency and the like.

6. The system as claimed in claim 4, wherein the central server comprises:
    a data receiving means;
    an accessing means to access the data/content;

an interpreting and scheduling means to interpret and schedule the data/content as per a schedule list;
a storing means to store the data/content;
a remote signal inducing means (RSIM); and
a relaying means.

7. The system as claimed in claim 6, wherein the remote signal inducing means contains an infrared (IR) transmitter and a frequency generator that is attuned to create desired frequencies.

8. The system as claimed in claim 6, wherein the interpreting and scheduling means forwards a request for a frequency to be tuned to the remote signal inducing means at a desired time.

9. The system as claimed in claim 6, wherein the remote signal inducing means (RSIM) interprets the forwarded frequency and generates relevant IR frequency signals.

10. The system as claimed in claim 7, wherein the generated relevant IR frequency signal is received by the set-top box which causes to switch a channel thereby modifying an audio-video output.

11. The system as claimed in claim 4, wherein the smart IB is connected to a television through the set top box or directly.

* * * * *